Jan. 15, 1963  G. KIPER  3,073,232
TIMING MECHANISM FOR CAMERA SHUTTERS
Filed Jan. 4, 1960  3 Sheets-Sheet 1

INVENTOR.
GERD KIPER
BY

Jan. 15, 1963   G. KIPER   3,073,232
TIMING MECHANISM FOR CAMERA SHUTTERS
Filed Jan. 4, 1960   3 Sheets-Sheet 2

INVENTOR.
GERD KIPER
BY

Jan. 15, 1963     G. KIPER     3,073,232
TIMING MECHANISM FOR CAMERA SHUTTERS
Filed Jan. 4, 1960     3 Sheets-Sheet 3

INVENTOR.
GERD KIPER
BY

United States Patent Office 3,073,232
Patented Jan. 15, 1963

3,073,232
TIMING MECHANISM FOR CAMERA SHUTTERS
Gerd Kiper, Unterhaching, near Munich, Germany, assignor to Agfa Aktiengesellschaft, Leverkusen, Bayerwerk, Germany
Filed Jan. 4, 1960, Ser. No. 392
Claims priority, application Germany Jan. 13, 1959
14 Claims. (Cl. 95—63)

The present invention relates to cameras.

More particularly, the present invention relates to the timing controls used in connection with the shutter of a camera to control the exposure time.

At the present time, controls which determine the length of time that a camera shutter is maintained open suffer from several defects. For example, in certain types of structures the drive for the shutter is acted upon by a gear train or the like so as to be retarded in its movement and the shutter drive cooperates with such a gear train either through a pin which is connected to and carried by the first gear of the gear train or by cooperation with a lever which acts on such a pin, and in either event it is quite clear that depending upon the particular angular position of such a pin the moment arm through which the retarding mechanism cooperates with the shutter drive will vary. This variation in the moment in the transmission between the retarding mechanism and the shutter drive introduces undesirable inaccuracies in the operation of the timing mechanism. Thus, it is quite clear that the retarding effect or the retarding influence of the retarding mechanism on the shutter drive will diminish with an increasing moment arm.

Moreover, in many types of mechanisms it is difficult to provide accurate controls at relatively short exposure times as well as at relatively long exposure times. The elements of the mechanism cannot be constructed as ruggedly as desired and oftentimes the steps of a cam, for example, cannot be made substantially large to provide the desired settings with the desired accuracy.

One of the objects of the present invention is to overcome the above drawbacks by providing a camera with a structure for controlling the exposure time in such a way that there will be no variable moment arm between the retarding mechanism and the shutter drive which will undesirably influence the accuracy of the operation of the structure.

Another object of the present invention is to provide a structure which will enable the parts to be very ruggedly and accurately constructed both for producing extremely short exposure times as well as producing longer exposure times.

A further object of the present invention is to provide a structure where the camera can be repeatedly operated a large number of times at the range of extremely short exposure times without producing any undesirable wear or stress on the components of the structure.

It is an additional object of the present invention to provide a structure which will control the extent to which the mass of the mechanism influences the operation of the shutter drive.

With the above objects in view the present invention includes in a camera a support means and a shutter drive carried by the support means for driving the shutter from its closed to its open and back to its closed position. A lever means of the invention has a free end which is located along the path of movement of a projection of the shutter drive means, and the structure of the invention includes a retarding means for retarding the operation of the shutter drive. This retarding means is turnably connected with the lever means and acts through the latter on the shutter drive to control the speed of operation thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
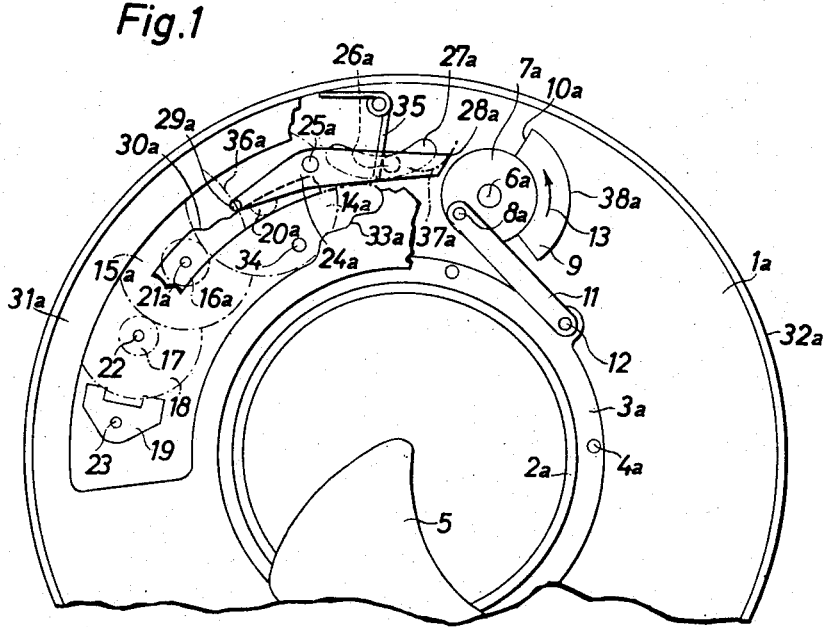
FIG. 1 is an elevation view illustrating the structure of the invention in one embodiment thereof.

Referring now to FIG. 1, there is illustrated therein part of a shutter assembly which includes a wall 1a of a shutter housing, this wall 1a of the shutter housing forming a support means for part of the structure and surrounding the lens tube 2a of the objective assembly of the camera. A shutter ring 3a is carried by the lens tube 2a and carries a plurality of pivot pins 4a on which the shutter blades 5 are turnable, only one shutter blade 5 being shown in FIG. 1 for the sake of clarity. These shutter blades are connected through pin-and-slot connections in a well known manner with the wall 1a of the support means so that during the turning of the rings 3a with respect to the tube 2a the shutter blades will move with respect to each other for the purpose of opening and closing the shutter in a well known manner.

A shutter drive means 7a is provided, this shutter drive means being carried by the support means through the medium of a pivot pin 6a fixed to the wall 1a and turnably supporting the rotary shutter drive means 7a. The shutter drive means includes a pin 8a connected to the rotary shutter drive to rotate therewith and a projection 9a having a control end 10a. A connecting rod 11 interconnects the pin 8a with the pin 12 of the shutter ring 3a so that through the connecting rod 11 rotary movement of the shutter drive means 7a is transmitted to the shutter ring 3a for operating the shutter. The shutter drive means 7a is driven by an unillustrated spring which is tensioned when the shutter is cocked in a well known manner, and upon actuation of the shutter release plunger the shutter drive 7a is released to the influence of this tensioned spring to be driven by the latter. When thus released to the drive spring the rotary shutter drive means 7a turns in the direction of the arrow 13 of FIG. 1.

The support means 1a carries a retarding means shown in FIG. 1 in dot-dash lines as including the gear train 14a, 16a, 15a, 17, 18. Thus, this retarding means includes the gear 14a turnably supported by the stationary pin 20a which is carried by the wall 1a, the gear 14a meshing with a pinion 16a fixed coaxially to the gear 15a, and both of the elements 15a and 16a are turnably supported by the pin 21a which is fixed to the wall 1a. The gear 15a in turn meshes with a pinion 17 fixed coaxially to the escapement wheel 18, and elements 17 and 18 and turnably supported by a stationary pin 22 fixedly carried by the wall 1a. The escapement wheel 18 cooperates with an escapement 19. The escapement 19 is pivotally supported by a pin 23 which is fixed to the support means formed by the wall 1a, but if desired the pin 23 may itself be carried by a lever which is turnably supported by the wall 1a so that the escapement 19 may be moved in this way into or out of engagement with the escapement wheel 18.

A motion transmitting lever means 24a has an end 28a located in the path of movement of the edge 10a of the rotary shutter drive means 7a, and this motion transmitting lever means 24a of the invention is turnably connected with the element 14a of the retarding means through a pivot pin 25a which is carried by the gear 14a and which turnably supports the lever means 24a intermediate its ends. The retarding means 14a—23 acts through the lever means 24a on the shutter drive means 7a to control the speed of operation of the latter in a manner described below.

A pin-and-slot means is formed in part by the support means 1a and in part by the lever means 24a for the purpose of participating in the guiding of lever means 24a and this pin-and-slot means includes the pin 26a fixed to the lever means 24a and entering into the arcuate slot 27a which is formed in the wall 1a.

The shutter assembly includes a manually turnable ring 31a forming a time-setting member whose angular position is set whenever the operator turns the exposure time-setting ring of the objective assembly of the camera, the manner in which the turning of this latter ring is transmitted to the time-setting member 31a being purely conventional and not illustrated for the sake of clarity. This time-setting member 31a is provided at an elongated cutout thereof with a camming edge 30a, and the lever means 24a carries a follower pin 29a which cooperates with the stepped camming edge 30a for the purpose of controlling the angular position of the lever means 24a before the latter is engaged by the rotary shutter drive means 7a, and in this way the particular exposure time is regulated in part with the embodiment of FIG. 1. This rotary exposure time-setting member 31a is turnably supported by the outer tubular member 32a of the shutter assembly and the time-setting member 31a is formed with an additional camming edge 33a which cooperates with the follower pin 34 fixedly carried by the gear 14a for the purpose of additionally controlling the angular position of the lever means 24a and thus also participating in the control of the exposure time. The wall 1a carries a wire spring 35 one end of which presses against the pin 26a of the lever means 24a for returning the parts to their starting position.

By setting the angular position of the time-setting ring 31a a desired exposure time is set into the camera. Thus, the lever means 24a has its position set either by cooperation of the follower pin 29a with the camming edge 30a or by cooperation of the follower pin 34 with the camming edge 33a. The pin 29a moves along a compound curve 36a during adjustment of the ring 31a. By thus setting the ring 31a the lever means 24a is set in an angular position which will allow the shutter drive means 7a to turn freely through a predetermined portion of its entire travel before it engages the lever means 24a. Thus, the period during which the retarding means 14a—23 will act through the lever means 24a on the shutter drive means 7a can be controlled in this way. The camming edges 30a and 33a as well as the pins 29a and 34 are so arranged with respect to each other that at any possible time-setting there will always be at least one of these pins in engagement with its cooperating camming edge. The spring 35 guarantees that either the pin 29a will engage the camming edge 30a or the pin 34 will engage the camming edge 33a, and thus a predetermined setting of the lever means 24a before it is engaged by the shutter drive means 7a is assured.

When the shutter is released by the operator the shutter drive means 7a will be driven by the unillustrated spring in the direction of the arrow 13, as pointed out above. The result is that the connecting rod 11 will turn the shutter ring 3a so as to move the blades 5 to a position where they open the shutter in order to expose the film. The edge 10a of the shutter drive means 7a will engage the end 28a of the lever means 24a when the shutter is in its open position. Now, of course, the retarding means will act through the lever means 24a on the shutter drive means and during this time the end 28a of the lever means 24a will move through a compound curve 37a. Thus, the operation of the shutter drive means 7a is retarded so that a predetermined period of time will pass before the shutter is closed. When the control edge 10a of the shutter drive means moves beyond the end 28a of the lever means 24a this end 28a will slide along the outer periphery 38a of the projection 9a during the continued turning of the shutter drive means 7a.

During the cocking of the shutter the shutter drive means 7a is returned in a known way to its starting position and the drive spring therefore is also tensioned. During this return movement of the shutter drive means the periphery 38a of the projection 9a slides along the end 28a of the lever means 24a until the control edge 10a moves beyond the end 28a in the direction opposite to the arrow 13, and now the spring 35 can return the retarding means 14a—23 and the lever means 24a to their starting position.

Figure 2:
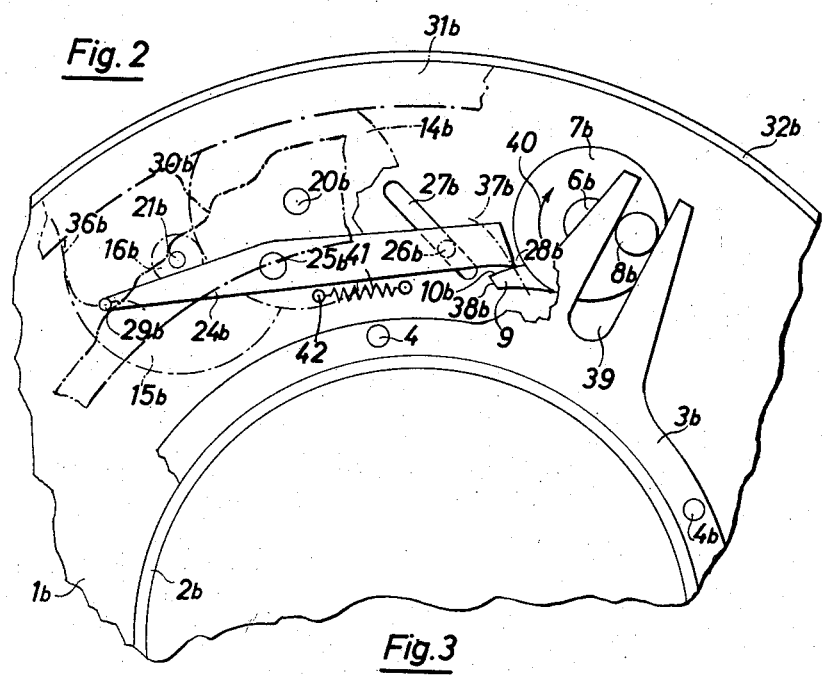
FIG. 2 is a fragmentary view on an enlarged scale as compared to FIG. 1 of a second embodiment of a structure according to the invention.

In the embodiment of the invention which is illustrated in FIG. 2 the retarding means is identical with that of FIG. 1 and therefore is not illustrated in its entirety. Referring now to FIG. 2, it will be seen that the shutter drive means 7b has its pin 8b located within a slot 39 formed in a projection of the shutter ring 3b whose pins 4b pivotally support the shutter blades in the same way as in the embodiment of FIG. 1b. The wall 1 of FIG. 2 carries the pin 6b which turnably supports the shutter drive means 7b, and in this embodiment the shutter drive means 7b turns through a complete revolution in the direction of the arrow 40 in order to open and close the shutter, so that with this embodiment there is no necessity to return the shutter drive means to its starting position. The lever means 24b is in the embodiment of FIG. 2 also pivotally connected by the pin 25b to the gear 14 of the retarding means. Also, the lever means 24b fixedly carries a pin 26b cooperating with a slot 27b formed in the wall 1b, so that this pin-and-slot connection participates in the guiding of the lever means 24b. Also, the end 28b of the lever means 24b will move along a compound curve 37b during engagement of the end 28b of the lever means 24b with the control edge 10b of the projection 9b of the shutter drive member 7b, the end 28b moving along the outer edge 38b of the projection 9b as soon as the control edge 10b moves beyond the end 28b. A spring 41 is connected at one end to the wall 1b and at its opposite end to a pin 42 carried by the gear 14b so that it is the spring 41 in the embodiment of FIG. 2 which returns the retarding means and the lever means 24b to their starting position. The lever means 24b of this embodiment also carries a follower pin 29b, and this pin 29b cooperates with a camming edge 30b of a turnable time-setting member 31b which is set by the operator in the manner described above in connection with FIG. 1, and during engagement with the camming edge 30b the pin 29 will move along a compound curve 36b indicated in FIG. 2.

The structure is illustrated in FIG. 2 at the instant when the projection 9b has engaged the end 28b of the lever means 24b so that the retarding means has just begun to act through the lever means 24b on the shutter drive means 7b to control the speed of operation of the latter. The retarding of the shutter drive means 7b terminates when the slightly curved control edge 10b moves beyond the end 28b of the lever means 24b. Inasmuch as the drive 7b turns in a single direction through a single revolution in one cycle of operation and need not be turned in an opposite direction, the projection 9b and its outer edge 38b can be made relatively short and the lever means 24b can be returned by the spring 41 to its starting position even during the time that the drive 7b continues to operate after the projection 9b moves beyond the lever means 24b.

Figure 3:
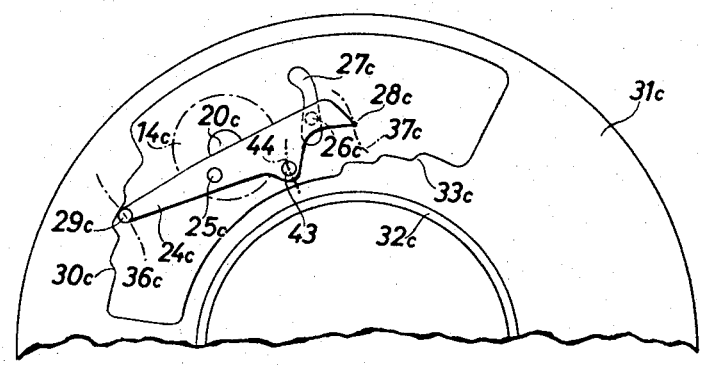
FIG. 3 is a fragmentary illustration of a third embodiment of a structure according to the present invention.

Referring now to the embodiment of the invention which is illustrated in FIG. 3, the retarding means again is identical with that of FIG. 1 and is therefore illustrated in part. Also, the shutter drive means can have either the construction of FIG. 1 or that of FIG. 2. The control edge of the projection of the shutter drive means cooperates with the end 28c of the lever means 24c of FIG. 3 so as to move the end 28c along the compound curve 37c, and it will be noted that this lever means 24c with the embodiment of FIG. 3 also is turnably carried by the gear 14c of the retarding means through a pin 25c which is carried by the gear 14c. Furthermore, the lever means 24c carries a pin 26c located in a slot 27c thus forming a pin and slot connection between the support means and the lever means 24c to participate in the guiding of the latter. The manually turnable time-setting ring 31c is provided with a pair of camming edges 30c and 33c in the embodiment of FIG. 3, and this time-setting member is turnably supported by the lens tube 2c. The lever means 24c carries a pair of follower pins 29c and 43 respectively cooperating with the camming edges 30c and 33c of the time-setting member 31c, and as is illustrated in FIG. 3 the follower pin 29c will move along the compound curve 36c during cooperation of the follower 29c with the camming edge 30c of the time-setting member 31c. The pin 43 will move through the compound curve 44 during cooperation with the camming edge 33c. During one part of the setting of the ring 31c in order to introduce a first range of exposure times into the camera the pin 29c will cooperate with the camming edge 30c while during the introduction of a second range of exposure times into the camera the pin 43 will cooperate with the camming edge 33c. With this arrangement a particular advantage is provided since even when there are extremely short differences between the successive settings of the exposure time there nevertheless will be steps at the camming edges which are sufficiently large to provide the desired settings with the desired accuracy. Moreover, with this arrangement it is possible to move one or the other of the follower pins of the lever means 24c along relatively large steps of the camming edges even with turning of the ring 31c through a relatively small angle, without any danger of jamming.

Figure 4:
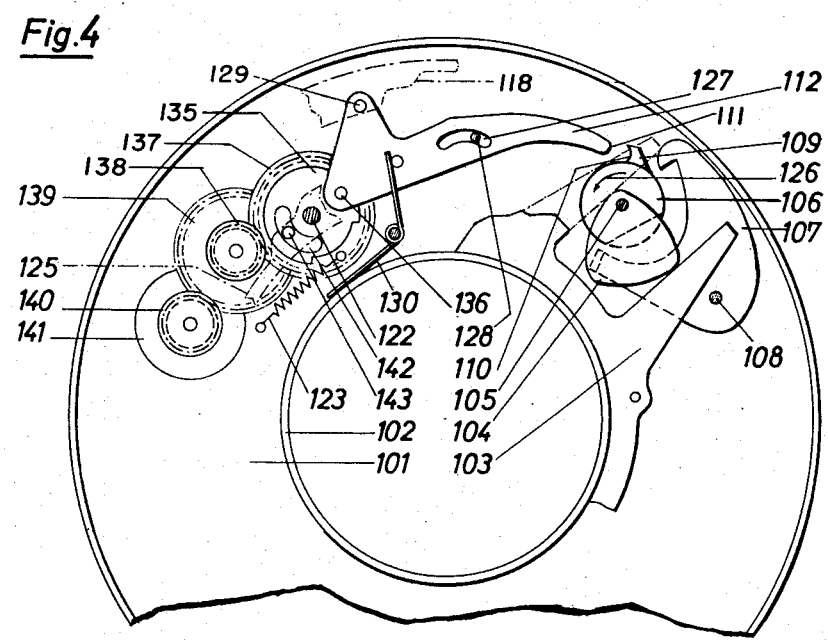
FIG. 4 shows a fourth embodiment of the structure.

Referring to the embodiment of the invention which is illustrated in FIG. 4, it will be seen that the structure of FIG. 4 includes a wall 101 of the housing of the shutter assembly, this wall 101 forming a support means in the manner described above in connection with the walls 1a–1c. This wall 101 surrounds the tube 102 of the objective assembly, and the shutter ring 103 is turnably carried by this tube and controls the blades of the shutter in the well known manner described above in connection with FIG. 1. The shutter ring 103 is provided with a notched projection which receives the cam 104 which has the configuration of an equilateral triangle with convexly curved sides, and this rotary cam 104 actuates the shutter ring 103 to turn the latter back and forth so as to open and close the shutter. The cam 104 is fixed with a rotary member 106 so that the elements 104, 106 form the shutter drive means, and the unillustrated drive spring turns the rotary member 106 in the direction of the arrow 126 during driving of the shutter. The cocked shutter is maintained cocked by the catch 107 which is pivotally supported by the pin 108 carried by the wall 101, and this catch 107 is turned by the operator when it is desired to release the shutter for operation. The shutter drive means 104, 106 is turnably supported by a pin 105 fixedly carried by the wall 101. This rotary shutter drive 106 is provided with a projection 109 having a control edge 110. The control edge 110 turns along a path where the end 111 of the motion transmitting lever means 112 is located so that the projection 109 will engage the end 111 of the motion transmitting lever means 112 to cause the retarding means to act through the lever means 112 on the shutter drive means 104, 106. In the embodiment of FIG. 4 the pin-and-slot connection between the support means 101 and the lever means 112 takes the form of a slot 127 formed in the lever means 112 and a pin 128 fixedly carried by the wall 101 and extending into the slot 127. The rotary time-setting ring is provided with a stepped camming edge 118 shown in dot-dash lines and cooperating with a pin 129 which is carried by the lever means 112, and the wall 101 carries a spring 130 also cooperating with a pin fixed to the lever means 112 so as to return the parts to their starting position.

The retarding means of the embodiment of FIG. 4 includes a freely turnable plate or disc 135 pivotally connected at 136 to the lever means 112 and formed with an arcuate slot 142 whose center coincides with the axis of the pin 122 which supports the disc 135 for free turning movement, this pin 122 being fixedly carried by the wall 101. The retarding means further includes a gear train 137–141, and the gear 137 of this gear train is also turnable on the pin 122, this gear 137 fixedly carrying a pin 143 which extends into the slot 142, so that in this way there is a pin-and-slot connection 142, 143 between the freely turnable member 135 connected with the lever means 112 and the first gear 137 of the gear train of the retarding means. It will be noted that the pin 143 of the pin-and-slot connection 142, 143 moves along the same arc as that along which the slot 142 is located, and thus by adjusting the angular position of the gear 137 with respect to the member 135 it is possible to locate the pin 143 at any desired distance from the ends of the slot 142 so as to disconnect the gear train 137–141 from the member 135, and as a result the lever means 112 can be turned by the shutter drive means 106, 104 through a predetermined distance before an end of the slot 142 engages the pin 143 to call the retarding means into operation, and thus it is possible with this construction to disconnect the retarding means from the lever means 112. A spring 123 is connected to one end at the wall 101 and at its opposite end to the gear 137 so as to keep the pin 143 in engagement with a camming edge 125 of the manually turnable exposure time-setting ring corresponding to element 31, and in this way when the exposure time is set the camming edge 125 cooperates with the pin 143 to locate the latter at a predetermined distance from the ends of the slot 142 so as to regulate the extent to which the lever means 112 and element 135 will turn without transmission of the retarding means through the lever means 112 to the shutter drive 104, 106. The gear train includes in addition to the gear 137 the pinion 138 meshing therewith and fixed coaxially to the gear 139 which meshes with a pinion 140 fixed coaxially to a gear 141, the coaxial pinion 138 and gear 139 being turnably supported by a suitable pin carried by the wall 101, and the coaxial pinion 140 and gear 141 also being turnably supported by suitable pin carried by the wall 101.

When the shutter is released the tensioned spring which is not shown will drive the shutter drive means 106, 104 so as to turn the latter in the direction of the arrow 126, and the projection 109 will engage at its control edge 110 the end 111 of the lever means 112 to move the latter and the freely turnable disc 135 therewith. The movement of the shutter drive means 106, 107 is retarded by the mass of the elements of the gear train 137–141 which must be turned by energy derived from the spring which rotates the shutter drive means 106, 104, and also to some extent retarding will be derived from the return springs 130 and 123 which are tensioned during driving of the shutter by the drive means 106, 104. As a result of the pin-and-slot connection 142, 143 of the invention it is possible while providing full engagement of the lever means 112 by the drive means 106, 104 nevertheless to provide partial or full disconnection of the gear 137 from the disc 135 through the camming edge 125 of the time-setting ring, and in this way the mass which influences the drive means 106, 104 in order to retard the latter, can be controlled in accordance with the desired exposure time. The pin 143 may, for example, be placed in the position illustrated in FIG. 4. In this case the gear train 137–141 will come into play only when the disc 135 has been turned by the lever means 112 through a given angle, so that the retarding means acts only partially on the shutter drive means 106, 104. By moving the pin 143 to such a position that the gear train 137–141 does not at all come into play during opening and closing of the shutter, it is possible to further control the operation. The extent to which the shutter drive means is retarded can also be diminished according to the position in which lever means 112 is placed by the camming edge 118 in cooperation with the follower pin 129, and thus it is possible to position the lever means 112 so that it is only engaged by the shutter drive 106, 104 when the latter has already turned through more or less of a given fraction of its entire angle of turning. After the projection 109 moves beyond the end 111 of the pawl 112 the spring 130 will return the latter and the disc 135 to their starting position, and in a corresponding manner the spring 123 will return the gear train 137–141 of the retarded means to its starting position, the shutter drive 106, 104 being of the type which turns through a complete revolution so that it need not be turned about in the opposite direction. The camming edge 125 in cooperation with the pin 143 will of course control the position to which the gear train 136–141 is moved by the spring 123.

Figure 5:
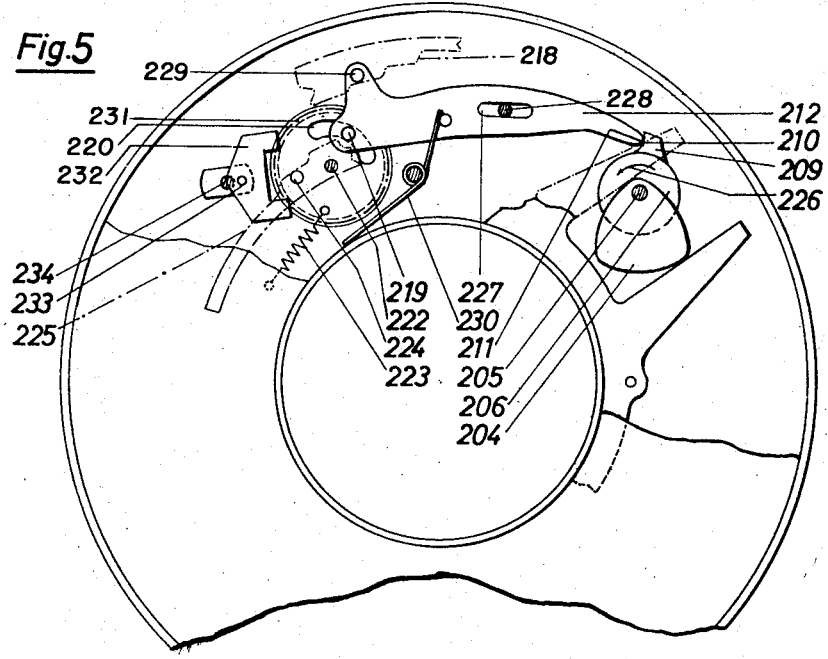
FIG. 5 shows a fifth embodiment of the structure according to the present invention.

Another possible embodiment of the present invention is illustrated in FIG. 5 where a shutter assembly which includes a shutter housing wall surrounding the lens tube of the objective is also provided. In FIG. 5 only the rotary shutter drive member 206 with the element 204 which engages the notched projection of the shutter ring is illustrated for the sake of clarity. The rotary shutter drive means 206 includes the projection 209 provided with the control edge 210 and turns in the direction of the arrow 226, this control edge 210 cooperating with the end 211 of the motion transmitting lever means 212 which is formed with the slot 227 which receives the pin 228 which is fixed to the transverse wall of the shutter housing which forms the support means of the illustrated structure. A spring 230 returns the parts to their starting position and the lever means 212 carries a cam follower pin 229 cooperating with the camming edge 218 of the manually turnable time-setting member of this embodiment.

In the embodiment of FIG. 5 the pin 219 carried by the lever means 212 extends into a slot 220 formed in an escapement wheel 231 which together with the escapement 232 forms the entire retarding means of the embodiment of FIG. 5, the pin-and-slot connection 219, 220 forming the structure of the embodiment of FIG. 5 which serves to turnably connect the lever means 212 to the retarding means. The escapement 232 is pivotally carried by pin 233 mounted on a lever which is turnable about a stationary pin 234 so that the pin 233 is eccentrically mounted for the purpose of adjusting the position of the escapement 232 with respect to the escapement wheel 231. A spring 223 connected at one end to the stationary wall of the shutter assembly and at its opposite end to the escapement wheel 231 urges a pin 224 of this escapement wheel into engagement with a camming edge 225 of a manually turnable time-setting ring of this embodiment, and in accordance with the angular position of this ring the camming edge 225 will cooperate with the pin 224 to locate the slot 220 at a predetermined angular position with respect to the pin 219 so that in this way the retarding means is disconnected from the lever means 212 to permit free movement of the latter through a given angle before the lever means is acted upon by the retarding means, and of course, the camming edge 218 cooperates with the pin 229 to set the pawl 212 in a starting position which will enable the drive 206, 204 to turn through a predetermined angle before it comes into contact with the lever means 212.

Thus, with the embodiment of FIG. 5 the extent to which the retarding means acts through the lever means 212 on the shutter drive means is dependent upon the angular position of the escapement wheel 231 which is controlled by the time-setting ring, and it will be seen that with this embodiment the lever means 212 is guided by the pair of pin-and-slot connections 227, 228 and 219, 220.

With the structure as illustrated in FIGS. 4 and 5 it is thus easily possible to prevent the gear train of FIG. 4 or the escapement mechanism of FIG. 5 from acting on the drive when extremely short exposure times on the order of 1/500, 1/250 or 1/125 of second are used, the position of the lever means 112 acting to retard the shutter drive at this time whereas when longer exposure times on the order of 1/60 of a second and longer are desired the gear train of FIG. 4 or the escapement of FIG. 5 may be drawn into play.

Also with all of the embodiments of the invention it will be seen that the moment arm of the transmission between the retarding means and the shutter drive is at all times substantially constant so that the undesirable inaccuracies resulting from a variation in this moment arm are completely avoided.

Particularly with the embodiments of FIGS. 4 and 5, since only a relatively small number of very rugged elements come into play during extremely short exposure times, the structure can be operated very reliably over a long period of time for cameras which are designed to make repeated very short exposures, and at the same time it is possible to provide the camming edges with relatively large steps even though the differences between the several settings are quite small so that considerable accuracy is obtainable with the structure of the invention.

Of course, the invention is not necessarily limited to all of the details described above. In accordance with the particular type of retarding mechanism, for example, the pin-and-slot connection of the embodiment of FIGS. 4 and 5, in particular, may be provided at any desired parts of the retarding mechanism.

It will be understood that each of the elements described above, or two or more together, may also find a useful application in other types of cameras differing from the types described above.

While the invention has been illustrated and described as embodied in timing mechanisms for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a support structure; shutter drive means carried by said support structure for driving a shutter from its closed to its open and then back to its closed position, said shutter drive means having a projection which moves along a given path during the time that said shutter drive means drives the shutter; an elongated lever structure having a free end located in said path to be engaged by said projection during movement of said shutter drive means; retarding means carried by said support structure for retarding the operation of said shutter drive means so as to maintain the shutter open for a preselected period of time, said retarding means acting on said lever structure and through said lever structure on said shutter drive means; and pivoting means between said support structure and elongated lever structure pivotally supporting said lever structure on said support structure, said pivoting means being mounted on one of said structures for movement relative to the other of said structures in such a manner as to move relative to said other structure during the time that said retarding means acts through said lever structure on said shutter drive means and constructed so as to maintain substantially constant, by such relative movement during action of said retarding means, the moment exerted by said retarding means upon said shutter drive means through said elongated lever structure.

2. In a camera as recited in claim 1 said projection of said shutter drive means cooperating with said free end of said lever structure for moving said free end along a predetermined curve.

3. In a camera as recited in claim 1, pin-and-slot means formed in part by said support structure and in part by said lever structure to provide for said movement of said pivoting means relative to said other structure.

4. In a camera as recited in claim 1, a time-setting member movably carried by said support structure and having a camming edge; and a cam follower pin fixedly carried by said lever structure and cooperating with said camming edge to be influenced by the latter for angularly positioning said lever structure according to the setting of said time-setting member.

5. In a camera as recited in claim 1, said retarding means including a rotary motion transmitting member pivotally connected to said lever structure; a manually operable time-setting member movably carried by said support structure and having a pair of camming edges; and a pair of follower pins respectively cooperating with said camming edges and respectively carried by said lever structure and said motion transmitting member of said retarding means.

6. In a camera as recited in claim 1, a manually operable time-setting member movably carried by said support structure and having a pair of camming edges; and a pair of follower pins carried by said lever structure and respectively cooperating with said camming edges.

7. In a camera as recited in claim 1, spring means cooperating with said lever structure for returning the latter and said retarding means to a starting position after the shutter drive means has moved through a given cycle of operations.

8. In a camera as recited in claim 1, means cooperating with said retarding means for optionally placing the latter out of operative engagement with said lever structure.

9. In a camera, in combination, a support means; shutter drive means carried by said support means for driving a shutter from its closed to its open and then back to its closed position, said shutter drive means having a projection which moves along a given path during the time that said shutter drive means drives the shutter; lever means having a free end located in said path to be engaged by said projection during movement of said shutter driven means; retarding means carried by said support means for retarding the operation of said shutter drive means so as to maintain the shutter open for a preselected period of time, said lever means being turnably connected with said retarding means and said retarding means acting through said lever means on said shutter drive means with a susbtantially constant moment arm provided by said lever means and means cooperating with said retarding means for optionally placing the latter out of operative engagement with said lever means, said means for optionally placing said retarding means out of driving engagement with said lever means including a pin-and-slot connection between said lever means and a part of said retarding means.

10. In a camera, in combination, a support means; shutter drive means carried by said suport means for driving a shutter from its closed to its open and then back to its closed position, said shutter drive means having a projection which moves along a given path during the time that said shutter drive means drives the shutter; lever means having a free end located in said path to be engaged by said projection during movement of said shutter drive means; retarding means carried by said support means for retarding the operation of said shutter drive means so as to maintain the shutter open for a preselected period of time, said lever means being turnably connected with said retarding means and said retarding means acting through said lever means on said shutter drive means with a substantially constant moment arm provided by said lever means; and disengaging means cooperating with said lever means and retarding means for optionally disengaging the latter from said lever means, said disengaging means including a pin-and-slot connection the slot of which is movable with respect to said pin in order to disengage the retarding means from the lever means.

11. In a camera, in combination, a support means; shutter drive means carried by said support means for driving a shutter from its closed to its open and then back to its closed position, said shutter drive means having a projection which moves along a given path during the time that said shutter drive means drives the shutter; lever means having a free end located in said path to be engaged by said projection during movement of said shutter drive means; retarding means carried by said support means for retarding the operation of said shutter drive means so as to maintain the shutter open for a preselected period of time, said lever means being turnably connected with said retarding means and said retarding means acting through said lever means on said shutter drive means with a substantially constant moment arm provided by said lever means; and disengaging means cooperating with said lever means and retarding means for optionally disengaging the latter from said lever means, said disengaging means including a pin-and-slot connection the slot of which is movable with respect to said pin in order to disengage the retarding means from the lever means, said slot extending along an arc of a circle.

12. In a camera, in combination, a support means; shutter drive means carried by said support means for driving a shutter from its closed to its open and then back to its closed position, said shutter drive means having a projection which moves along a given path during the time that said shutter drive means drives the shutter; lever means having a free end located in said path to be engaged by said projection during movement of said shutter drive means; retarding means carried by said support means for retarding the operation of said shutter drive means so as to maintain the shutter open for a preselected period of time, said lever means being turnably connected with said retarding means and said retarding means acting through said lever means on said shutter drive means with a substantially constant moment arm provided by said lever means; and disengaging means cooperating with said lever means and retarding means for optionally disengaging the latter from said lever means, said disengaging means including a pin-and-slot connection the slot of which is movable with respect to said pin in order to disengage the retarding means from the lever means, said slot extending along an arc of a circle, and the pin of the pin-and-slot connection being movable along said circle.

13. In a camera, in combination, a support means; shutter drive means carried by said support means for driving a shutter from its closed to its open and then back to its closed position, said shutter drive means having a projection which moves along a given path during the time that said shutter drive means drives the shutter; lever means having a free end located in said path to be engaged by said projection during movement of said shutter drive means; and retarding means carried by said support means for retarding the operation of said shutter drive means so as to maintain the shutter open for a preselected period of time, said lever means being turnably connected with said retarding means and said retarding means acting through said lever means on said shutter drive means with a substantially constant moment arm provided by said lever means; and disengaging means for optionally disengaging the retarding means from said lever means, said retarding means including a gear train and said disengaging means including a rotary member forming part of the retarding means and pivotally connected with the lever means, said rotary member and first gear of the gear train being connected with each other through a pin-and-slot connection so that the rotary member may be located in an angular position where the ends of the slot of the pin-and-slot connection are spaced from the pin so as to disconnect the rotary member from the gear train of the retarding means.

14. In a camera as recited as claim 1, said retarding means including an escapement wheel and an escapement and said lever structure being connected to said escapement wheel through a pin-and-slot connection so that when the pin of the latter connection is spaced from the end of the slot the lever structure is disconnected from the escapement wheel of the retarding means.

References Cited in the file of this patent

UNITED STATES PATENTS

| | | |
|---|---|---|
| 2,527,800 | Dorsey | Oct. 31, 1950 |
| 2,650,526 | Gebele | Sept. 1, 1953 |
| 2,727,445 | Rentschler | Dec. 20, 1955 |
| 2,849,937 | Burger | Sept. 2, 1958 |
| 2,900,888 | Burger | Aug. 25, 1959 |
| 2,926,586 | Gebele | Mar. 1, 1960 |